J. K. SAX & G. W. KEAR.

Car-Wheel.

No. 8,017. Reissued Dec. 25, 1877.

Attest:

Fred Benjamin

Frank McGreen

Inventors

John K Sax

Geo. W. Kear

By their attorney

C. E. Foster

UNITED STATES PATENT OFFICE.

JOHN K. SAX AND GEORGE W. KEAR, OF PITTSTON, PENNSYLVANIA, ASSIGNORS OF ONE-THIRD THEIR RIGHT TO R. B. BROCKWAY AND JOSEPH HILEMAN, OF SAME PLACE.

IMPROVEMENT IN CAR-WHEELS.

Specification forming part of Letters Patent No. 88,743, dated April 6, 1869; Reissue No. 3,954, dated May 3, 1870; Reissue No. 8,017, dated December 25, 1877; application filed November 22, 1877.

*To all whom it may concern:*

Be it known that we, JOHN K. SAX and GEORGE W. KEAR, formerly of Kingston, but now of Pittston, Luzerne county, Pennsylvania, have invented Improvements in Railway-Car Wheels, of which the following is a specification:

Our invention consists of a cast-iron wheel with a band of steel around the tread, fused to the body, and covering the wearing-surface, and with a wrought-metal lining to the hub.

In order to enable others skilled in the art to which our invention appertains to make and use the same, we will now proceed to describe its construction, referring to the annexed drawing, which forms a part of this specification, and in which—

Figure 1:
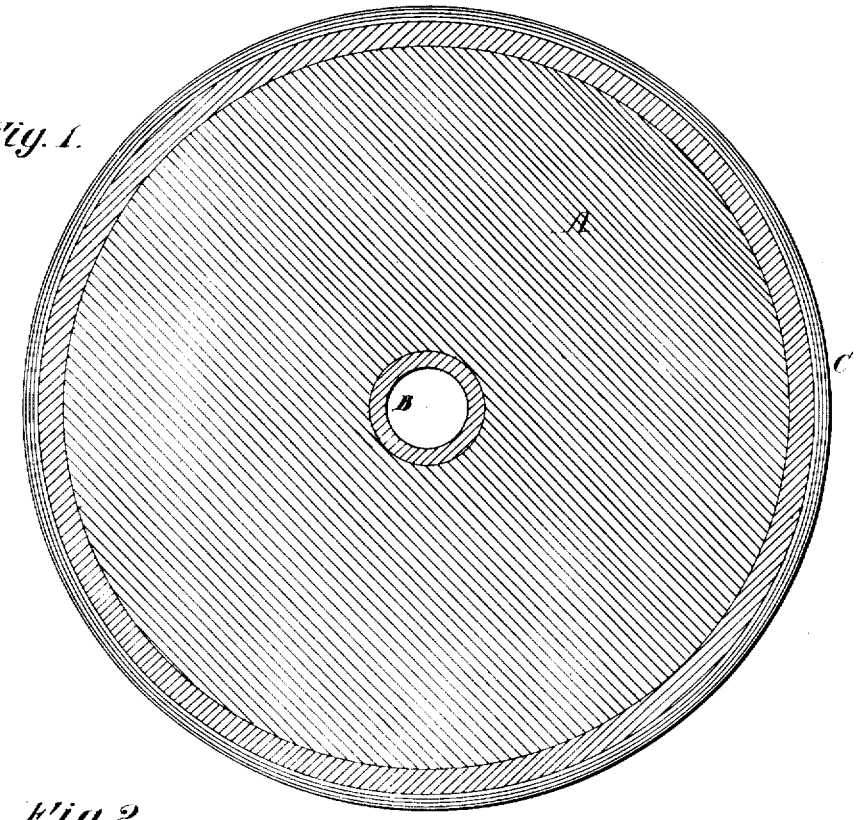
Figure 2:
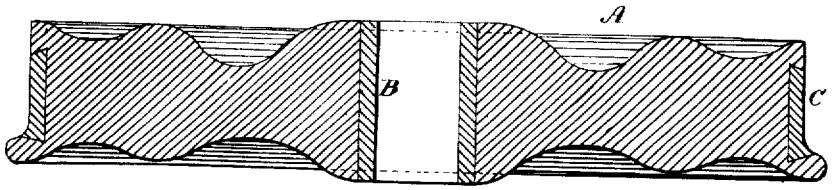

Figure 1 represents a vertical section of the wheel, and Fig. 2 a cross-section.

A represents a cast-iron wheel, which is provided with a tread, C, of steel, of suitable width and thickness to cover the wearing portion of the tread and flange, the remaining portion of the periphery, which is subjected to but little wear, being in one piece with and forming part of the cast-iron body. In the hub of the wheel is a wrought-iron sleeve or lining, B.

In the manufacture of our wheels, we proceed in the following manner: We first make the usual hammered or rolled steel band, of suitable size and form for the circumference or tread and wearing part of the rim of the wheel. We also make a wrought-iron ring, sleeve, or re-enforce, to line the cast-iron hub and receive the axle. This sleeve and the band or tire are properly placed in the mold intended for casting the body of the wheel, the band and sleeve being sufficiently heated before being put into the mold, or they may be heated with the mold in an oven, and both are fluxed in the usual manner for welding cast-iron to steel or to wrought-iron in the process of casting the iron. All being thus prepared, the molten iron is poured in to form the body of the wheel. By this operation the body of the wheel is welded to both the steel band and to the wrought-iron ring by a single process, well known in welding molten iron to bar iron or steel.

As in the above process of manufacture the entire wheel is highly heated, (sufficiently to fuse the body to the steel band and the wrought-iron ring,) all parts of the wheel cool slowly together, thus preventing any local chilling of the metal or strain from shrinking; therefore there is but little need of any annealing process, and the wheels produced are of a superior quality.

The form of the wheel may be varied for the driving-wheel and for other purposes without departing from our invention.

In the drawing the steel band is shown as made so that the molten metal will overlap the edges of the band in the form of a dovetail. The welding, however, is sufficient to hold the parts in place.

The wheel thus made, with its body and part of its periphery of cast-iron, is economical to manufacture, and, with the tread or bearing portion of the periphery of cast-steel, fused to and forming a component part of the body, possesses the durability and strength which could not be attained by the use of cast-iron alone.

The wrought-iron lining or sleeve B—softer than the cast-iron body—further strengthens the wheel at the hub, to resist the strains resulting from forcing the wheel upon the axle.

We claim—

1. A wheel in which the body is of cast-iron and the tread of cast-steel, embedded in and welded to the cast-iron body, as set forth.

2. A wheel having a cast-iron body welded to a rolled or hammered cast-steel band, tire, re-enforce, or tread, substantially in the manner and for the purpose set forth.

3. A wheel having a body and part of the periphery of cast-iron and the wearing portion or tread of cast-steel, fused to the iron, as set forth.

4. A wheel having part of the periphery of cast-iron and the wearing part or tread of cast-steel, fused to a cast-iron body, and extending to and forming the wearing portion of the flange, as specified.

5. A wheel having the body and part of the periphery of cast-iron and the wearing portion or tread of cast-steel, a part of which is overlapped by the cast-iron portion, the steel and iron being fused or welded together, substantially as and for the purpose set forth.

6. A car-wheel having a cast-metal body and hub, and a sleeve of softer metal inserted in the axle-opening and welded to the body, as set forth.

In testimony whereof we have signed our names to this specification in the presence of two subscribing witnesses.

JOHN K. SAX.
GEO. W. KEAR.

Witnesses:
L. B. ENSIGN,
D. S. KOON.

Correction in Reissue Letters Patent No. 8,017.

I hereby certify that on this 30th day of March, 1878, I have caused the within title to Reissue Patent No. 8,017 to be corrected by the insertion of the names of R. B. Brockway and Joseph Hileman, of Pittston, Pennsylvania, as assignees of one-third right of John K. Sax and George W. Kear, the original patentees, by reason of an assignment recorded in Liber Y, p. 413, September 15, 1870, and in accordance with the request of all the parties concerned. The correction being made as of a clerical error.

March 30, 1878.